United States Patent [19]

Simmons

[11] Patent Number: 5,004,366
[45] Date of Patent: Apr. 2, 1991

[54] BREAK-AWAY COUPLING

[76] Inventor: George H. Simmons, 814 Weekslanding Rd., Cape May, N.J. 08204

[21] Appl. No.: 430,827
[22] Filed: Nov. 2, 1989
[51] Int. Cl.⁵ .............................................. F16D 9/00
[52] U.S. Cl. ...................................... 403/2; 52/98; 404/10
[58] Field of Search ................. 403/2; 52/98; 40/608; 404/10; 285/4

[56] References Cited

U.S. PATENT DOCUMENTS

| | | |
|---|---|---|
| 1,335,302 | 3/1920 | Stout . |
| 1,545,456 | 7/1925 | Rastetter . |
| 1,677,796 | 7/1928 | Parks . |
| 1,834,535 | 12/1931 | Riemenschneider . |
| 2,085,074 | 6/1937 | Boyles ........................................ 403/2 |
| 2,949,324 | 8/1960 | Birge et al. ........................... 40/608 X |
| 3,308,584 | 3/1967 | Graham ..................................... 52/98 |
| 3,349,531 | 10/1967 | Watson ..................................... 52/296 |
| 3,355,998 | 12/1967 | Roemish ..................................... 94/1.5 |
| 3,438,311 | 4/1969 | Remak ..................................... 404/10 |
| 3,521,413 | 7/1970 | Scott et al. ............................... 52/981 |
| 3,698,144 | 10/1972 | Stratton .................................. 403/2 X |
| 3,912,404 | 10/1975 | Katt ........................................ 403/2 |
| 4,850,565 | 7/1989 | Moreno ................................... 248/545 |
| 4,858,876 | 8/1989 | Moreno ................................... 248/545 |

Primary Examiner—Andrew V. Kundrat
Attorney, Agent, or Firm—Eckert Seamans Cherin & Mellott

[57] ABSTRACT

A break-away coupling for mounting an elongated member, such as a roadside sign post, includes two opposingly fixed engagement members connected to one another end-to-end. The first engagement member is attached relative to the ground either by a plate or by a plate attached to a stake-like member. The second engagement member is attached to the elongated member. The engagement members have facing flange plates, each flange plate having an opening aligned with an opening in the other plate and a shear bolt projects through the openings to fix the flanges plates together. The shear bolt is either constructed of relatively easy-to-break material or includes a weakened area. When the elongated member is struck, the shear bolt breaks and the engagement members disconnect without damage. The bolt is easily replaced to quickly reassemble the sign post.

26 Claims, 2 Drawing Sheets

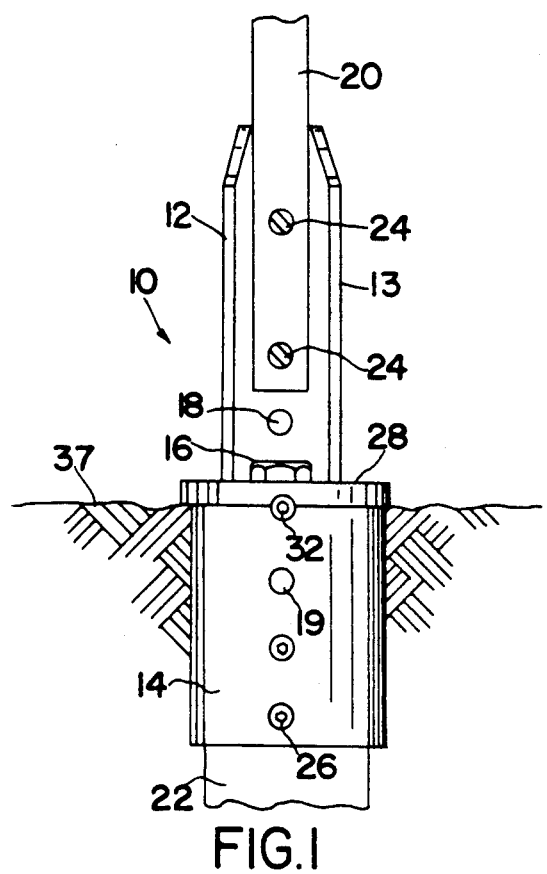
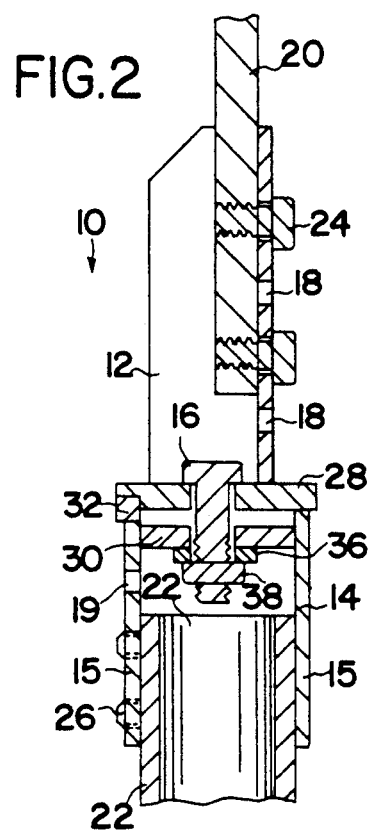
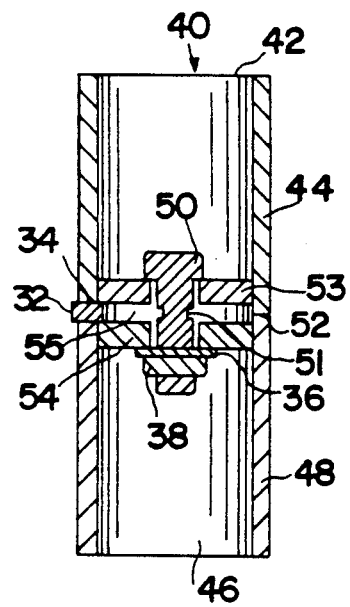
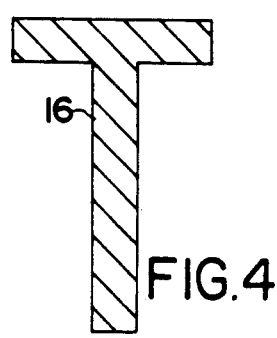

BREAK-AWAY COUPLING

BACKGROUND OF THE INVENTION

1. Field of the Invention

This invention relates to a break-away coupling for mounting an elongated member.

2. Description of the Prior Art

Highways and city streets, parking lots, and the like usually have many sign posts located along their boundaries or marking special areas. Frequently these sign posts are hit by vehicles and the post is bent or broken off and must be replaced. Hitting a rigid unyielding signpost damages both the vehicle and the post, and the broken and/or bent posts pose a hazard to any vehicle or pedestrian passing by. The posts are also expensive to replace. In order to replace most broken or damaged posts, the complete post is replaced, including that post portion which is retained in the concrete of the street or in the ground. It is therefore beneficial to have such sign posts held in position in a manner such that if hit they break apart at a predetermined point (yielding to the impact and lessening the damage to the vehicle). Also, if the predetermined point is above the ground, the below-ground post section will not need to be replaced.

Many have addressed the problem of sign post damage by supplying break-away or fracturable posts, brackets and/or couplings. Most have attempted to solve the problem by supplying sectional posts or support structures. U.S. Pat. No. 1,373,979. Ryal discloses a pole supported on a base plate. A bolt forms a swivel connection between the base and the pole. This use of a center pin to couple abutting structures is common. While Ryal's device allows for swivel movement of the post on the base support, it does not provide for break-away coupling.

U.S. Pat. No. 4,171,919—Wills discloses identical but oppositely oriented complementary connecting portions which mate to form a space through which a deformable coupling member is inserted. When hit, the connection disconnects, but the structural elements remain undamaged.

U.S. Pat. No. 3,628,296—Henry discloses a telescoping assembly in which each section is preforated longitudinally, the sections held to each other by inserting connecting means between aligned perforations. When hit, the post breaks because of its relatively weakened nature caused by the perforations. Obviously, both telescoping sections of the post must be replaced each time the post breaks.

In other disclosures abutting posts are set end-to-end on pins which are placed in a vertical axis of the posts and the pins are made narrower or less able to withstand stress than the posts so that the pins break, causing the post sections to disconnect, but not themselves to break or deform. Such shear pins are provided as single bolts on the central vertical axis or as a plurality of vertically aligned pins. Such connection is found in U.S. Pat. No. 1,610,414—Bernard which employs sectionalized rod with center axial holes to receive a spring-set pin. When hit, the spring releases the pin and the rods separate. U.S. Pat. No. 4,441,288—Fledman discloses a swivel joint for connecting sections of drill pipe. The sections are rigidified to one another by a plurality of frangible pins which break under strain before the strain becomes great enough to break the drill. U.S. Pat. No. 3,355,998—Roemisch discloses abutting pole members with aligned recesses into which a fracturable plug is inserted. When the pole is hit, the fracturable plug breaks, allowing the pole members to disconnect.

U.S. Pat. No. 3,127,870—Beiber discloses a break-away rail for race tracks, wherein a plurality of co-linear sections are attached end-to-end by means of breakable intermediate connectors. The connectors are joined to each pipe section by through-bolts. Each connector has a weakened area aligned to the point of intersection of the pipe sections. When hit, the connector breaks at its weakened area and the pipe sections disconnect.

Another disclosure which employs an external connector rather than an internal vertical pin is U.S. Pat. No. 4,529,161—Lockwood in which a break-away mirror is held to the exterior of a vehicle by bracket which has abutting face-to-face plates. One plate is attached to the vehicle and the other to the mirror. The plates are encased in a resin with a frangible area aligned with the plane of abutment of the plates. When the vehicle mirror hits an impediment, the case breaks apart and the mirror detaches from the vehicle.

To date there is no break-away coupling which employs cup-shaped members overfitting either tubular or shaft-like post and stake members and which is reassembled by replacing the shear bolt only, thus being more economical and more simply repaired than the prior art.

SUMMARY OF THE DISCLOSURE

The present invention is a break-away coupling for mounting an elongated member, such as a roadside sign post. Two opposingly fixed engagement members are connected to one another end-to-end. The first engagement member is a lower member attachable relative to the ground. The upper member is attachable to the elongated member. The engagement members have facing flange plates, each flange plate having an opening aligned with an opening of the other flange plate. A shear bolt projects through the openings and fixes the flanges to each other. When the elongated member is struck with sufficient force, the shear bolt breaks and the engagement members disconnect without damage. The sign post is then easily reassembled with a new shear bolt and without having to replace the entire coupling and/or the elongated member itself. The above-the-ground component (road sign, street marker, parking meter or the like) is interchangeable while the mounting remains constant.

The preferred shear bolt is an aluminium pin which is square in cross section and fits in complementary holes so that the pin does not allow the engagement members to rotate relative to one another. Alternatively, if a square bolt is not used, an anti-pivot pin may be provided coplanar to the abutment of the flange plates and spaced from the axial center of the post. Each flange then may be bored to form aligned pin receptacles, the bore preferably being radial to the axis of the shear bolt and at the junction of the plates.

The engagement members preferably are coaxial with the elongated member and with the axis of the shear pin. However, the upper and lower engagement members may be asymmetrically abutted. The engagement members are preferably cup-shaped for fitting over a base post/stake or a sign post. The lower engagement member may be integral with a ground-engaging stake. Such a stake may be an angle iron or may be tubular The upper member may be semi-cylindrical and attached to the elongated member by bolts or it may be tubular and attached by set screws. The upper and lower engagement members may be opposing tubes with welded plates across one end serving as the flange plates.

It is, therefore, an object of this invention to provide a break-away coupling for safely mounting elongated members such as sign posts, fence posts, meters and other roadside markers so that when they are struck with force, they break at a predetermined point and do not deform or protrude in an unsafe position.

It is another object of this invention to provide a coupling for mounting roadside signs which is quickly and easily replaced.

It is still another object of this invention to provide a coupling for mounting interchangeable above-the-ground components while the in-the-ground components remain in place. It is a further object of this invention to provide a break-away coupling in which only the shear bolt is broken and needs replacement, the other coupling members remaining undamaged, in particular that coupling member which is at or under ground level.

It is a further object of this invention to provide an uncomplicated device for mounting roadside signs which is inexpensive to produce and includes inexpensive replacement parts.

It is still another object of this invention to provide a break-away coupling which prevents pivoting of one section upon the other.

It is yet another object of the invention to provide a breakaway coupling that is sufficiently inexpensive and easy enough to install and replace as to make the concept of a breakaway coupling suitable for very numerous and mundane roadside posts such as parking meters, lightweight warning signs and the like.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

BRIEF DESCRIPTION OF THE DRAWING(S)

FIG. 1 is a partial front view of the break-away coupling of this invention with a sign post held in the upper engagement member and a stake held in the lower engagement member.

FIG. 2 is a cross section of the break-away coupling of FIG. 1.

FIG. 3 is a top view of the upper engagement member of the break-away coupling of FIG. 1.

FIG. 4 is a cross section of the shear bolt of FIG. 2.

FIG. 5 shows a cross section of an alternative embodiment having both engagement members symmetrically abutted and of the same diameter, an anti-pivot pin in place, and the shear bolt shown with a weakened section.

DETAILED DESCRIPTION OF THE PREFERRED EMBODIMENT(S)

Figure 6:
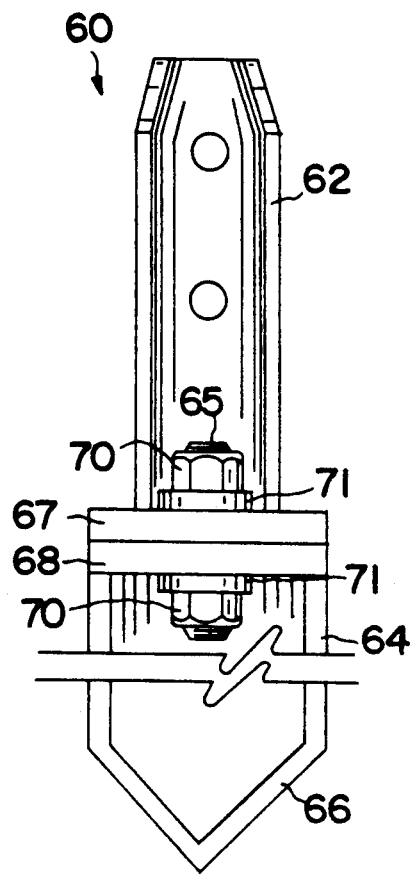
FIG. 6 illustrates an alternative embodiment with the lower engagement member forming a stake.

Referring now to the drawings, and more particularly to FIGS. 1-4, break-away coupling 10 is shown supporting sign post 20 and attached to a base in the form of stake 22. Coupling 10 has opposing fixed engagement members 12 and 14 joined end-to-end by shear bolt 16. It is preferable that engagement member 14 be either at ground level or near ground level in fact the abutmant of members 12,14 is preferably coplanar with the ground, as illustrated by ground level 37. One advantage of the break-away coupling of this invention is that the in-the-ground portion is not damaged when the coupling disconnects and the in-the-ground portion (member 14) need not be replaced, which is a problem, particularly in areas where the ground freezes or where the post is fixed in concrete. First upper engagement member 12 is generally cup-shaped in cross section (as seen in FIG. 3) with wall 13 in which are placed apertures 18 for receiving bolts 24. Bolts 24 extend through apertures 18 and the complementary aligned apertures in sign post 20. Bolts 24 hold post 20 inside engagement member 12. Engagement member 14 is generally cylindrical and has apertures 19 in wall 15 for accepting set screws 26 (or bolts as shown above). If stake 22 is generally cylindrical (as is illustrated), it is closely overfit by engagement member 14 and set screws 26 projecting through apertures 19 may be employed to hold stake 22 in fixed position inside engagement member 14. If stake 22 is not cylindrical and does not approximate the diameter of engagement member 14, bolts may be used as shown with sign post 20.

At the abutting end of each engaging member 12,14 a flange plate 28, 30 respectively closes the end and defines aperture means for receiving the projecting shear bolt 16. It is preferred that shear bolt 16 be aluminum, which is easily broken as compared to steel sign posts and engagement members. If a steel bolt 16 is used, it is preferred that it be scored or otherwise weakened to provide for shearing of the bolt. It is also preferred that bolt 16 be non-round (for example, square) in cross section, as illustrated in FIG. 4. This shaping helps to prevent shear bolt 16 from turning in place when struck. If desired, washer 36 and nut 38 may be used to tighten shear bolt 16 to one or the other flanges. When a rounded bolt is used, there is the possibility that engagement members 12 may pivot on engagement member 14 when sign post 20 is hit or in high winds. In order to prevent such pivot action, anti-pivot pin 34 (seen in FIG. 4) may be inserted into contour 32 which has been formed by boring out a receptacle in each of flanges 28,30. It is preferred that the bore be spaced radially from an axis defined by the shear bolt and that the center of the bore be at the junction of the plates. Thus, the plates 28,30 will still disconnect at their abutment and the lower engagement member 14 will not be damaged by resistance of the pivot pin to disconnect.

In an alternative break-away coupling 40, illustrated in FIG. 5, both upper and lower engagement members 42,46, respectively, may be tubular. In such an embodiment, the sign post and the stake are preferably also cylindrical and will be held in close relationship inside cylinder walls 44 and 48 respectively. Bolt 50 includes a weakened area 51 which is aligned with the space formed by the abutment of walls 44 and 48. Flange plates 53,54 are spaced apart from the ends of walls 44,48 and shear bolt 50 is tightened to the plates, forming slot 55 for further weakening the abutment. Thus, if it is required that bolt 50 be steel, slot 55 and weakened area 51 of bolt 50 provide for sufficient lessening of strength to the abutment for disconnection on impact.

Pivot pin 34 is placed transverse to walls 44,48 in a contoured or bored area of walls 44,48. When the supported sign post (being above the area illustrated in the drawing) is struck with force, pin 34 prevents upper member 42 from turning on lower member 46.

Figure 7:
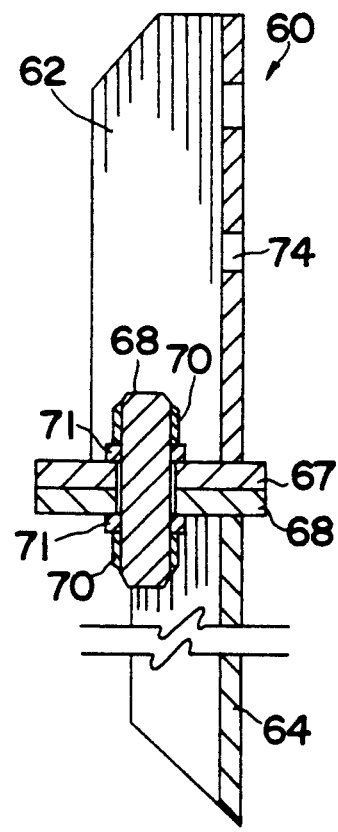
FIG. 7 illustrates the embodiment of FIG. 5 with the upper and lower engagement members abutted asymmetrically.

Now referring to FIGS. 6 and 7, alternative break-away coupling 60 utilizes U-shaped upper member 62 and integral stake/lower member 64. Upper member 62 is provided with apertures 74 for receiving fastening means to attach a sign post or the like. Plate 67 is welded to the end of upper member 62 and serves as a cap. Lower member 64 is generally elongated and generally U-shaped in cross section. Angle iron is preferred, but any stake-like post with a pointed end may be used. Plate 68 is welded to the top of lower member 64. When assembled, plates 67,68 abut each other and are joined in unmoving registration by square bolt 65. Because bolt 65 is squared and held by washers 71 and nuts 70, plates 67,68 cannot pivot on each other and it is not necessary to provide an anti-pivot pin for coupling 60.

A break-away coupling 10 for mounting an elongated member 20 comprises two opposingly fixed engagement members, 12,14. The first engagement member, namely lower member 14, is attachable relative to the ground, and the second engagement member 12 is an upper member attachable to the elongated member 20. The engagement members 12, 14 have facing flange plates 28,30 with aligned openings and shear bolt 16 projects through the openings in the flange plates to fix the plates together.

The break-away coupling 40 includes an anti-pivot pin 34 coplanar with the abutment of flange plates 53,54 resting in contour 32 which defines a pin receptacle spaced radially from the axis defined by the shear bolt 50. Countour 32 is a radial bore in flange plates 53,54 and the center of the bore is at the junction 52 of the upper member 42 and lower member 46.

The upper and lower engagement members are either cup shaped, as upper member 12 and lower member 64, or cylindrical, as upper member 42, lower member 46. The cup shaped or cylindrical interfitting members can respectively be the upper or lower connecting members (i.e., the male/female relationship can be inverted). Accordingly, the designations "upper" and "lower" are exemplary rather than limiting. The illustrated upper and lower members 42,46 are coaxial with the axis of shear pin 50 and with the axis of the elongated member 20. Upper and lower members 62,64 are asymmetrically abutting and are not coaxial with shear bolt 68. The break-away coupling 60 employs a lower engagement member 64 which is integral with a stake for insertion into the ground or for bonding in a suitable underlayment (e.g., concrete). Engagement member 64 may be angle iron and mounted at a radial space from the axis of the shear bolt. Engagement members 14,46,64 may also be tubular. All engagement members may be sized to overfit the post or stake to which they are fastened by bolts or set screws, welding, or by press fit. Upper and lower members 12,14 include apertures 18,19 for insertion of either bolts bolts 24 or set screws 26. Bolt 16 is aluminium and bolt 50 includes weakened area 51 for the desired shearing characteristics. Bolt may be rounded or squared bolt 68 which is fastened to the adjacent flange plates by nut and washer.

The flange plates 53,54 and 28,30 are recessed from the ends of the engagement members to which they are attached. The flange plates 67,68 form caps at the ends of the engagement members to which they are welded.

Inasmuch as the post sections are supported by the abutting flange plates and/or by a flange plate resting on the end of a tube, or by a cup-shaped engagement with a tube, the coupling is structurally strong and resists wear on the weakened bolt because the engagement supports the post section against transverse forces (e.g., wind) that would urge the coupling to bend. However, an impact perpendicular to the longitudinal axis of the post, especially near the lower area of the upper post section, neatly snaps the coupling apart, leaving substantially undamaged post sections which can normally be re-used.

Having now illustrated and described my invention, it is not intended that such description limit this invention, but rather that this invention be limited only by reasonable interpretation of the appended claims.

What is claimed is:

1. A break-away coupling for mounting an elongated member, comprising:
    two opposingly fixed engagement members connectable to one another end-to-end, a first engagement member being a lower member attachable relative to the ground and a second engagement member being an upper member attachable to said elongated member;
    said engagement members having facing flange plates, each flange plate having an opening aligned with an opening of the other said flange plate;
    a shear bolt projecting through said openings in said flange plates and fixing said flange plates together; and,
    an anti-pivot pin engaging between the opposingly fixed engagement members across a plane of abutment thereof, each of the engagement members having a contour defining a portion of a pin receptacle for receiving the anti-pivot pin at a point spaced radially from an axis defined by the shear bolt,
    whereby when said elongated member is struck with force, said shear bolt breaks and said engagement members disconnect without damage.

2. The coupling according to claim 1 wherein said shear bolt is non-rounded in cross section.

3. The coupling according to claim 2 wherein said shear bolt is square in cross section.

4. The break-away coupling according to claim 1 wherein said lower engagement member is a stake.

5. The break-away member according to claim 1 wherein said lower engagement member is cup-shaped for fitting over a base post.

6. The break-away coupling according to claim 1 wherein said first and second engagement members are coaxial with the axis of the shear pin.

7. The break-away coupling according to claim 1 wherein said first and second engagement members are coaxial with the elongated member.

8. The break-away coupling according to claim 1 wherein said elongated member is a roadside sign post.

9. The break-away coupling according to claim 1 wherein at least one of said first and second engagement members is spaced laterally of an axis defined by said elongated member.

10. The break-away coupling according to claim 1 wherein said first and second engagement members define aperture means for receiving fastening means.

11. The break-away coupling according to claim 10 wherein said upper engagement member is semi-cylindrical and is attached to said elongated member by bolts.

12. The break-away coupling according to claim 11 wherein said engagement member is U-shaped in cross section.

13. The break-away coupling according to claim 10 wherein said upper engagement member is tubular and is attached to said elongated member by bolts.

14. The break-away coupling according to claim 13 wherein said bolts are set screws.

15. The break-away coupling according to claim 1 wherein said anti-pivot pin is aluminum.

16. The break-away coupling according to claim 1 Wherein said shear bolt has a weakened portion.

17. The break-away coupling according to claim 1 wherein said shear bolt is aluminum 18. The break-away coupling according to claim 1 wherein said engagement members are opposing tubes with plates welded across one end and wherein said plates are the flange plates.

19. The break-away coupling according to claim 1 wherein said lower engagement member is attachable to a stake.

20. The break-away coupling according to claim 19 wherein said stake is an angle iron.

21. The break-away coupling according to claim 20 wherein said angle iron is mounted at a radial space from the axis of said shear bolt.

22. The break-away coupling according to claim 19 wherein said stake is a tube.

23. The break-away coupling according to claim 1 wherein said engagement members have means to at least partially overfit said elongated member and a ground engaging means, respectively.

24. The break-away coupling according to claim 1 further comprising a nut and washer fitted to at least one end of said shear bolt.

25. The break-away coupling according to claim 1 wherein the contour defines a cylindrical opening for the anti-pivot pin, the cylindrical opening intersecting each of the engagement members.

26. The break-away coupling according to claim 2 wherein said contour is a radial bore in said flange plates and wherein the center of the bore is at the junction of said plates.

* * * * *